United States Patent [19]

Kuivalainen et al.

[11] Patent Number: 5,318,755
[45] Date of Patent: Jun. 7, 1994

[54] METHOD AND APPARATUS FOR CLEANING FLUE GASES

[75] Inventors: Reijo Kuivalainen; Yam Y. Lee; Karukkampalayam M. Sellakumar; Charles M. Davis, all of San Diego, Calif.

[73] Assignee: A. Ahlstrom Corporation, Noormarkku, Finland

[21] Appl. No.: 982,696

[22] Filed: Nov. 30, 1992

[51] Int. Cl.$^5$ ............................................. B01D 50/00
[52] U.S. Cl. ................................... 422/171; 422/173; 422/177; 423/239.1; 423/239.2; 55/523
[58] Field of Search ............ 422/177, 173, 170, 171, 422/172, 180; 423/239, 215.5; 55/523

[56] References Cited

U.S. PATENT DOCUMENTS

| | | | |
|---|---|---|---|
| 3,892,536 | 7/1975 | Roeser et al. | 55/387 |
| 3,978,193 | 8/1976 | Fedor et al. | 422/177 |
| 4,134,733 | 1/1979 | Volker et al. | 422/177 |
| 4,160,009 | 7/1979 | Hamabe | 422/177 |
| 4,390,355 | 6/1983 | Hammond et al. | 55/523 |
| 4,455,180 | 6/1984 | Hillman et al. | 422/180 |
| 4,746,341 | 5/1988 | Komoda | 55/523 |
| 4,781,831 | 11/1988 | Goldsmith | 210/247 |
| 4,828,806 | 5/1989 | Flockenhaus et al. | 423/239 |
| 4,915,920 | 4/1990 | Kobayashi | 423/239 |
| 4,925,633 | 5/1990 | Doyle | 422/177 |
| 4,956,162 | 9/1990 | Smith et al. | 423/215.5 |
| 4,983,423 | 1/1991 | Goldsmith | 427/230 |
| 5,108,714 | 4/1992 | Iwata et al. | 422/180 |

*Primary Examiner*—Robert J. Warden
*Assistant Examiner*—Hien Tran
*Attorney, Agent, or Firm*—Nixon & Vanderhye

[57] ABSTRACT

Hot flue or process gases are cleaned utilizing an apparatus containing a barrier filter module formed of a monolithic ceramic support structure coated with a thin porous ceramic layer having a pore size of about 0.04–0.5 microns, and a catalyst module formed of a support structure coated with catalyst. The hot flue gases may be associated with a fluidized bed boiler plant, such as a circulating fluidized bed reactor. Gases to be cleaned are passed through the barrier filter module into contact with the thin porous ceramic layer, and then through the catalyst module so that there is a catalytic reaction with the gas.

29 Claims, 5 Drawing Sheets

METHOD AND APPARATUS FOR CLEANING FLUE GASES

FIELD OF THE INVENTION

This invention relates to an apparatus and a method for cleaning hot flue or process gases, and more particularly to an apparatus and a method in which flue gases are cleaned by hot gas filtration and catalytic emission reduction.

BACKGROUND OF THE INVENTION

It is known that the particulate filtration from hot gas can be performed by means of ceramic filter elements arranged in a filter vessel. The walls of the filter vessel are protected against high temperature by appropriate insulation. The filter vessel further usually comprises water cooled steel support plates for supporting the filter elements. The construction is thereby heavy and space consuming. The ratio of filtrate volume flow to filtration area of conventional ceramic filters is low and therefore makes the use of these filters economically unjustified especially for hot gas cleaning in atmospheric conditions.

Reduction of pollutant gaseous emissions can be done by means of the Selective Catalytic Reduction (SCR) method or Selective Noncatalytic Reduction (SNCR) method. Both methods being utilized especially for $NO_x$ reduction. Typical $NO_x$ emissions from coal combustion, where staged air injection and SNCR, e.g. ammonia or urea injection, is utilized, are in the range of 50 to 60 ppm.

The SCR systems are being utilized to reduce $NO_x$ emissions from oil and gas firing applications, in which the initial $NO_x$ concentration in the flue gases can be much higher than in coal combustion, e.g. 500 to 1000 ppm. As the level of permitted NOX emission rates decreases may SCR also be utilized for further lowering the NOX emissions in pulverized combustion of solid fuels. In these systems the catalyst, e.g. $V_2O_5/TiO_2$ or zeolite, is typically attached as a thin layer on a honeycomb type support structure. The flue gas flows through the passageways of the honeycomb elements or "cells" and NO is being reduced by e.g. ammonia in presence of the catalyst surface.

Such honeycomb elements need to be changed in certain intervals in order to replace the poisoned catalyst elements with new ones. The catalysts may be poisoned by various gaseous or ash components, e.g. alkali- or As-compounds. The dimensions of the passageways in such catalyst elements depend on how clean the gas to be cleaned is, i.e. free of dust and gaseous impurities. In gas and oil combustion, very dense gridded passageways can be used, whereas dusty gas from solid fuel combustion needs wider channels, and hence a large volume requirement for the catalyst honeycomb system.

It is e.g. known from European patent application EP 470659 to clean gas in a catalytic filter. The filter consists of a ceramic support and catalytic substance. The filter elements may be porous sintered elements in the form of filter candles. The filter elements are doped with a catalytic substance. Dust and gaseous organic compounds in hot gases can be removed with these catalytic filters simultaneously. A drawback in this gas cleaning system is that the entire catalyst filter elements have to be replaced by regenerated or new filter elements when either the filter part is made non-operative, by plugged pores, or the catalyst material is poisoned, by trace compounds, heavy metals, such as As, or alkaline deposition, or by some other reasons.

Multiple-passageway porous monolithic cross-flow filters are known from U.S. Pat. No. 4,781,831. These filters have a large amount of filtration surface area relative to the volume of the device and consequently provide a compact filtration device. The filtration device further utilizing effectively the multiple-passageways, provides a low pressure drop flow path for the filtrate. These monolithic filters can also be used as a membrane support for membrane devices. Such membranes can include separation barriers suitable for e.g. cross-flow microfiltration, ultrafiltration and gas separation. U.S. Pat. No. 4,983,423 shows a method for forming a porous membrane on such a membrane support.

SUMMARY OF INVENTION

It is an object of the present invention to provide an improved method and apparatus for cleaning flue gases from combustors or the like, according to which catalyst poisoning is minimized and replacement of catalyst elements is readily done without the need to replace other gas cleaning elements.

It is a further object of the present invention to provide an improved method and apparatus for cleaning flue gases, according to which filtration of flue gases is improved and replacement of filter elements can be easily done without the need to replace other gas cleaning elements.

It is also an object of the present invention to provide an improved integrated filtration and catalyzing device for cleaning hot flue gases which can be constructed in modules.

It is further an object of the present invention to provide a compact hot gas cleaning system, in which catalyst life is extended.

It is still further an object of the present invention to provide a compact gas cleaning system in which filters and catalysts or parts thereof can be cleaned separately.

According to the present invention, the above described objects are achieved by a cleaning method in which flue gases are first cleaned in a barrier filter module, formed of a monolithic ceramic filter support structure coated with a thin porous ceramic layer, the pores of the ceramic layer being typically 0.04 to 0.5 μm and thereafter in a catalyst module, formed of a support structure coated with catalyst, and arranged downstream of the barrier filter module.

There is according to the present invention further provided an apparatus for cleaning flue gases. The apparatus comprises at least one barrier filter module, a catalyst module and means for leading gas from the barrier filter module to the catalyst module. The barrier filter module is formed of a monolithic ceramic filter support structure coated with a thin porous ceramic layer. The pores of the ceramic layer are preferably in the range of about 0.04 to 0.5 μm, the ceramic layer thereby forming a barrier filter. The catalyst module is formed of a support structure coated with catalyst material.

According to the present invention porous honeycomb monolithic ceramic elements are utilized as supports for ceramic filter membrane attached on the honeycomb elements for removing particulates from hot flue or process gases. These monolithic ceramic support elements having a high surface area and being made of relatively low cost materials they are widely used as catalyst support for automotive catalytic converters. The monoliths may be extruded in a variety of configurations and are commercially available.

The monoliths have a multiplicity of passageways or "cells", which are uniformly spaced throughout the support structure and extend from an inlet end face to an opposing outlet end face. Gas flowing through the monolithic filter first flows into the passageways and thereafter perpendicularly to the passageways through the ceramic material forming the filter. The passageway may have a round, square, triangular or any other suitable cross-section. The monoliths can have tens to thousands of passageways extending through them. In support structures the cell "density" usually varies between 25 to 1400 cells per square inch of the cross section of the monolith.

Monolithic ceramic filter support structures may be fabricated from different porous ceramics, such as cordierite, alumina, mullite, silica, zirconia, silicon carbide and the mixtures thereof, cordierite being the most commonly used material. Depending on the specific ceramic material, porosity of the support structure can be all the way from below 30% to over 50% by volume. The porosity is, however, in most cases preferably >30% most preferably between 30 and 50% by volume. The mean pore size in the monolithic filter support is in the order of about 4 to 50 $\mu$m.

In the monolithic ceramic filter used for removal of fine particles, according to the present invention, the inlet side of the monolithic ceramic filter support is covered with a fine porous ceramic membrane coating, forming a barrier filter on the support structure. The thickness of the barrier filter membrane may be about 2 to 100 $\mu$m, preferably about 50 $\mu$m. The pore size of the ceramic layer is approximately 100 fold finer than that of the monolithic support, the pore size being preferably in the range between 0.04 to 0.5 microns.

As the inlet side of the passageways in the monolithic ceramic filter support structure is covered by the membrane coating, the pores of the support structure itself do not become plugged by particulate matter during filtration. The pore size in the ceramic membrane coating being much smaller than that in the support structure, the retention efficiency of the filter module will be mainly determined by the membrane pore size.

The filter module according to the invention will therefore function as a high-temperature barrier filter, having a very low pressure drop, preferably <400 mbar in pressurized systems and optimally <100 mbar in atmospheric systems. The filtration velocity through the barrier filter varies typically within the range of 1 to 5 cm/s.

For the catalyst module support structure, according to the invention, both porous or impermeable elements are commercially available. In porous type support structures, in which the gas flows through a porous wall from a gas inlet passageway to a gas outlet passageway, the pores of the support structure are coated with catalyst material and the gas contacts the catalyst while flowing through the porous walls. In the impermeable type support structure only the passageways themselves are coated with the catalyst and the $NO_x$ reduction takes place as the gas contacts the passageway walls.

In an apparatus according to the present invention both support structures, the filter module support and the catalyst module support, may be of the porous type and preferably have the same cross sectional dimensions. Consequently also the gas flow through both support structures will then have essentially the same velocity. If, however, the catalyst module structure is of the impermeable type and gas is allowed to flow directly through all passageways, whereas the gas in the porous filter elements has to flow through a porous wall from one passageway into another, then the gas velocity in the catalyst passageways will be about 50% of the gas velocity in the filter passageways.

An identical casing, e.g. honeycomb type, can be used for both support elements. The length of the filtration section and the catalyst section can of course be different, since they will be defined by the surface area requirement for on the one hand the filter and on the other hand the catalyst. The cross section of the filter and catalyst elements can be circular, square or triangular or any other suitable form.

The filter and catalyst modules, preferably in honeycomb casings, can be arranged in compartments from which the modules or parts of them can be easily withdrawn for maintenance. Two or more filter modules can be arranged on top of each other or side by side in a common compartment or in separate compartments. The present invention thereby provides a very flexible overall gas cleaning system, in which damaged, dirty or otherwise inoperative modules easily can be replaced by regenerated or new modules.

Two different catalyst modules for reduction of two different types of emissions may also be arranged consecutively in the gas flow, whereby gas e.g. is first cleaned of $N_2O$ and thereafter of CO.

According to the present invention the monolithic membrane barrier filter module and the monolithic catalyst module can be arranged in a very compact configuration side by side in one single casing, without any noticeable space between the modules. Due to the small overall size and compact construction of the apparatus, the filter elements can easily be removed from the process gas stream for maintenance.

The filter and catalyst modules may according to another embodiment of the present invention be arranged in a configuration which leaves a short space between the modules. This enables an additional feature of the invention, according to which means for additive injections are arranged in the space between the filter and catalyst sections. This combination may be utilized as a SCR system for reducing $NO_x$ emissions. Ammonia or urea is injected downstream of the filter, into a clean gas, whereby decomposition of the ammonia due to fly ash or other fine dust is prevented. In prior art systems ammonia is injected upstream of combined catalyst filters, whereby ammonia decomposes when penetrating through the particulate layer, e.g. ash layer, accumulated on hot filter surfaces. The present invention provides a new method in which the ammonia requirement is reduced.

Cleaning of an filter module apparatus according to the present invention can be carried out by means of pulse jetting, reverse gas flow or vibrations (mechanical or acoustic). The filter modules can be cleaned periodically by high pressure, >1 bar, with a cleaning gas system designed to inject gas intermittently for selected duration countercurrently into the main gas stream. The pressure of the cleaning gas is typically 2 to 3 times the system pressure, e.g. 3 to 6 bar in atmospheric systems and 2 to 3 times the pressure in pressurized systems. Thermal shocks in the filter and cracking may be prevented by injecting the cleaning gas pulses through the catalyst modules, in which the cleaning gas may be efficiently preheated.

For failure detection, the filter can be equipped with an injection system for a trace medium (gas, dust, etc.) to the dusty side. By using a suitable detector (visual, optical, etc.), a fault can be located from the clean side.

The on-line fault detection and the possibility to withdraw a filter or catalyst module or compartment on-line from the gas stream provides an easy possibility to substitute a broken filter element with a new one or only blinding the faulty element in the compartment.

The invention provides following advantages:

a compact construction, which provides a possibility to integrate the hot gas filter and the catalyst module system with the convection section of a boiler system. Additionally heat may thereby be recovered from hot separated ash with heat transfer surfaces in the filter section;

low pressure drop over the integrated filter and catalyst module system, whereby two or more systems may be arranged in the gas flow without increasing the fan power requirement too much;

the catalyst module is not easily plugged as clean gas is introduced therein and a dense honeycomb support structure may be used, which leads to low equipment volume;

catalyst poisoning by ash is eliminated resulting in extended catalyst life;

the monolithic ceramic filter and the catalyst elements can be constructed in modules inserted in a honeycomb support structure, the filter and the catalyst modules having the same cross section. Separate modules may easily be removed for maintenance or replaced with new ones independently;

ammonia may be injected between the filter element and the catalyst element;

catalyst element may be used for preheating backpulsing gas used for cleaning the filter element;

heat transfer surfaces after the integrated filter/catalyst system, in e.g. the convection section, remain clean, no sootblowing is needed;

the absence of erosive particles in the gas flow after the integrated filter/catalyst system allows the convection section to be designed for higher gas velocities resulting in higher heat transfer coefficient, and smaller heat transfer surfaces;

the fouling tendency of the heat transfer surfaces is minimized;

there is no need for a bag house after the convection section.

BRIEF DESCRIPTION OF THE DRAWINGS

The invention will be described further, by way of examples, with reference to the accompanying drawings in which.

DETAILED DESCRIPTION OF THE DRAWINGS

Figure 1:
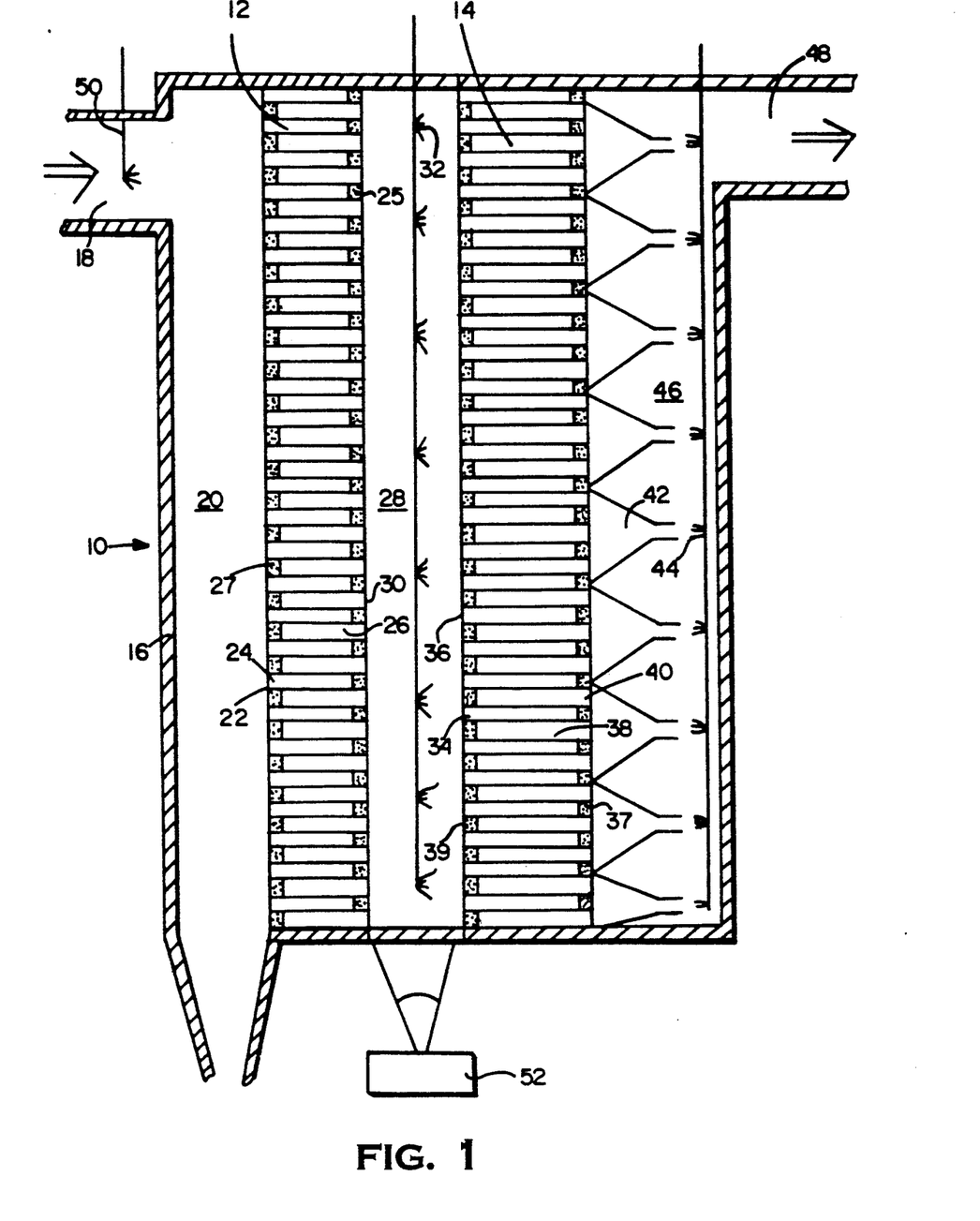
FIG. 1 is a schematic cross-sectional through a combined barrier filter and catalyst module system according to one embodiment of the present invention.

FIG. 1 shows a hot gas cleaning system 10 comprising a barrier filter module 12 and a catalyst module 14 arranged consecutively in a housing 16. A hot gas inlet 18 for unclean hot gas is arranged to lead gas into unclean gas inlet space 20. Gas inlets 22 lead into first passageways 24 in the barrier filter module, the gas inlets being in one end of the passageways. The other end of the passageways 24, are plugged with a plug 25, thereby preventing gas from flowing directly through the passageways. Parallel second passageways 26 for clean gas are arranged in the barrier filter module. Passageways 26 open, at one end, into a clean gas space 28 between the barrier filter module and the catalyst module. The opposite ends of the passageways 26 are plugged with a plug 27, thereby eliminating direct connection between passageways 26 and the gas inlet space 20.

Unclean gas flows from space 20 into first passageways 24 which are covered by a thin ceramic barrier filter layer, not shown in the figure, allowing only clean gas to flow through the filter material into adjacent second passageway 26, having a clean gas outlet 30 opening into clean gas space 28. Nozzles 32 are arranged in the clean gas space 28 for injecting ammonia, urea or some other additive into the gas, for e.g. reduction of NOX emissions.

Catalyst module 14 comprises inlet passageways 34 with inlet openings 36 opening into the clean gas space 28 and outlet passageways 38 having outlet openings 40 opening into outlet conduits 42. Passageways 38 and 34 are plugged at one end with plugs 37 and 39, respectively. Backpulsing nozzles 44 are arranged in front of the outlet conduits 42 for intermittently backpulsing cleaning gas countercurrently to the main gas stream through the catalyst filter into the clean gas side of the barrier filter.

Funnel shaped gas outlet conduits 42 open into a clean gas housing 46 from which clean gases are guided through outlet 48 into e.g. an adjacent convection section.

Trace medium may be introduced into the unclean gas flow through nozzles 50 at the hot gas inlet 18. The trace medium is separated from the gas flow in the barrier filter. Possible faults, e.g. cracks, in the barrier filter layer allow trace medium to escape into the clean gas space 28. Trace medium in the clean gas space is detected by a detector 52.

Figure 2:
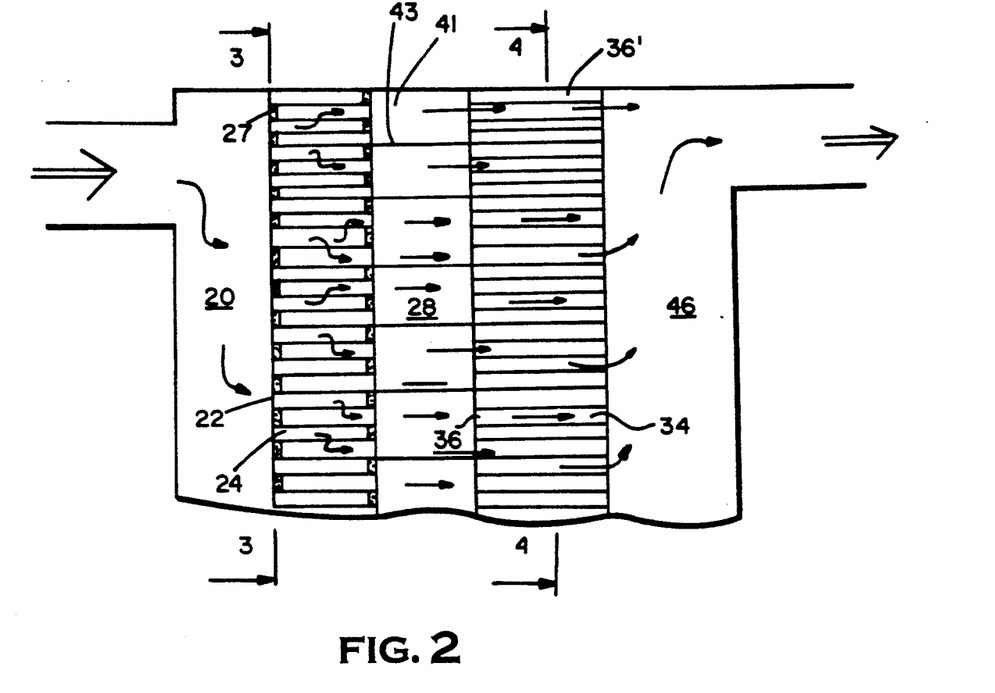
FIG. 2 shows a part of a schematic cross-sectional through a combined barrier filter and catalyst module system according to another embodiment of the present invention.

FIG. 2 shows another embodiment of the present invention, according to which the catalyst module is formed of a gas impermeable monolithic support structure. The passageways 36' are not plugged and gas is allowed to flow directly through the passageways.

Figure 3:
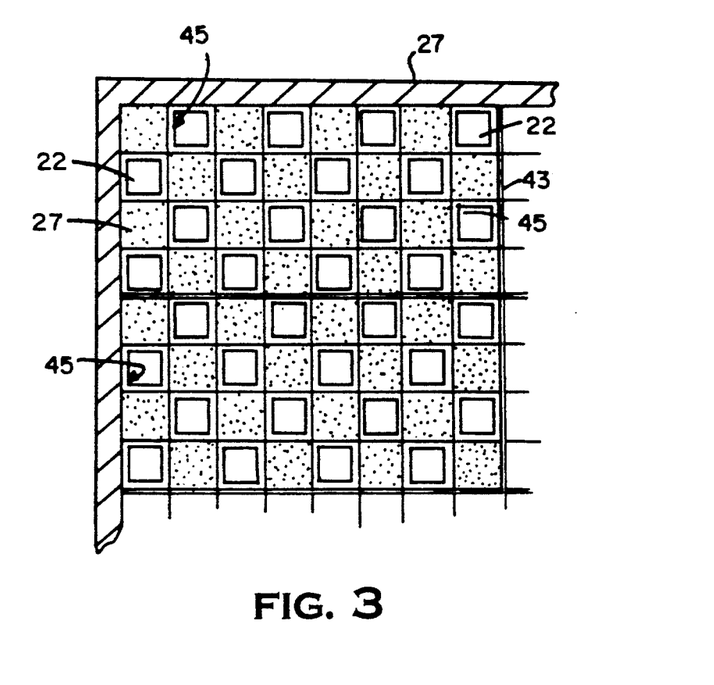
FIG. 3 shows an enlarged cross section of the barrier filter module shown in FIG. 2 taken along line AA.
Figure 4:
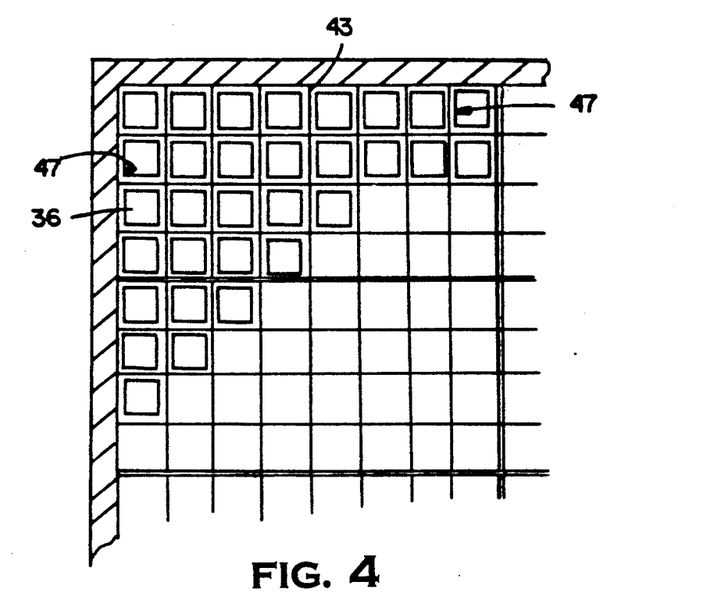
FIG. 4 shows an enlarged cross section of the catalyst module shown in FIG. 2 taken along line BB.

The filter and catalyst elements are combined into square blocks 41 by partition walls 43, each block having 4×4=16 filter and catalyst passageways, as can be seen in FIG. 3 and 4. FIG. 3 shows an enlarged cross sectional view of a part of the filter module in FIG. 2 taken along line AA and FIG. 4 shows an enlarged cross sectional view of a part of the catalyst module in FIG. 2 taken along line BB.

FIG. 3 shows the inlets 22 into the passageways 24 in the porous monolithic ceramic filter support structure, as well as, plugs 27 preventing direct connection between gas spaces 20 and 28. The passageways are coated with a thin porous ceramic membrane layer 45 forming the barrier layer in the filter. The barrier layer is about 2 to 100 $\mu$m thick, preferably about 50 $\mu$m thick. The pores of the porous ceramic layer are <0.5 $\mu$m, about 0.04 to 0.5 $\mu$m, whereas the pores in the ceramic monolithic support structure are about 4 to 50 $\mu$m.

FIG. 4 shows correspondingly the inlets 36 into the impermeable monolithic catalyst straight through passageways 34, which are coated with a catalyst layer 47.

Figure 5:
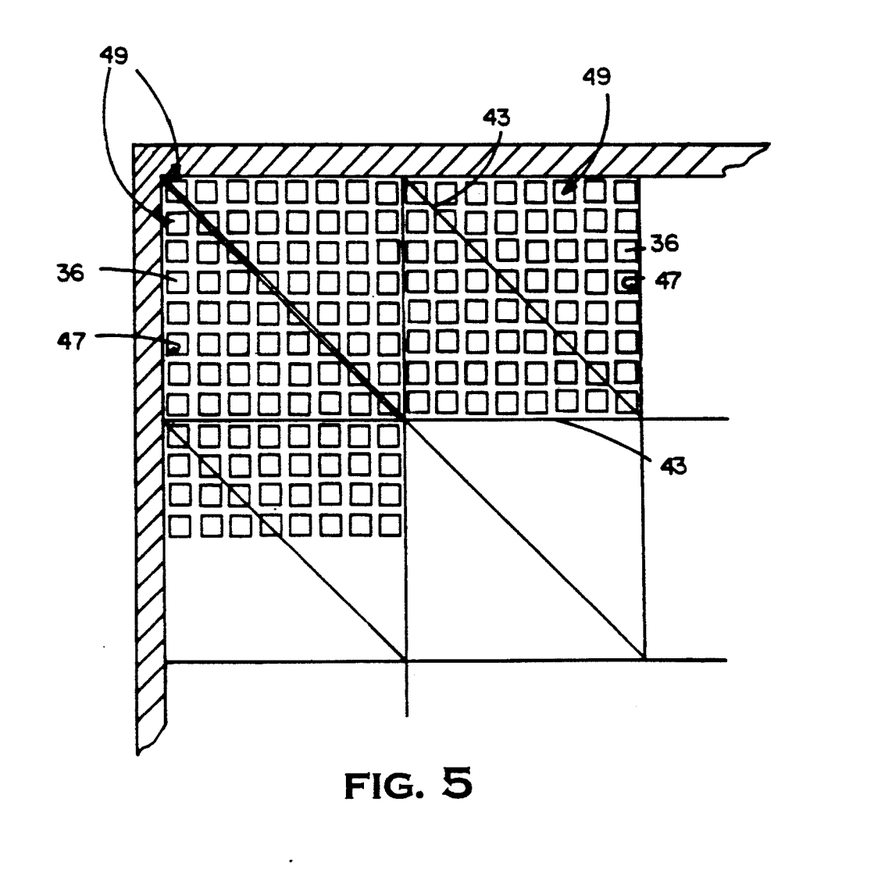
FIG. 5 shows an enlarged cross section of a barrier filter module, corresponding to FIG. 3, according to still another embodiment of the present invention.

FIG. 5 shows an other enlarged cross sectional view of a catalyst module in which catalyst elements are connected into triangular blocks 49 by partition walls 43. The filter or catalyst elements may be combined in different ways to form suitable blocks which can be disconnected from the support structure.

Figure 6:
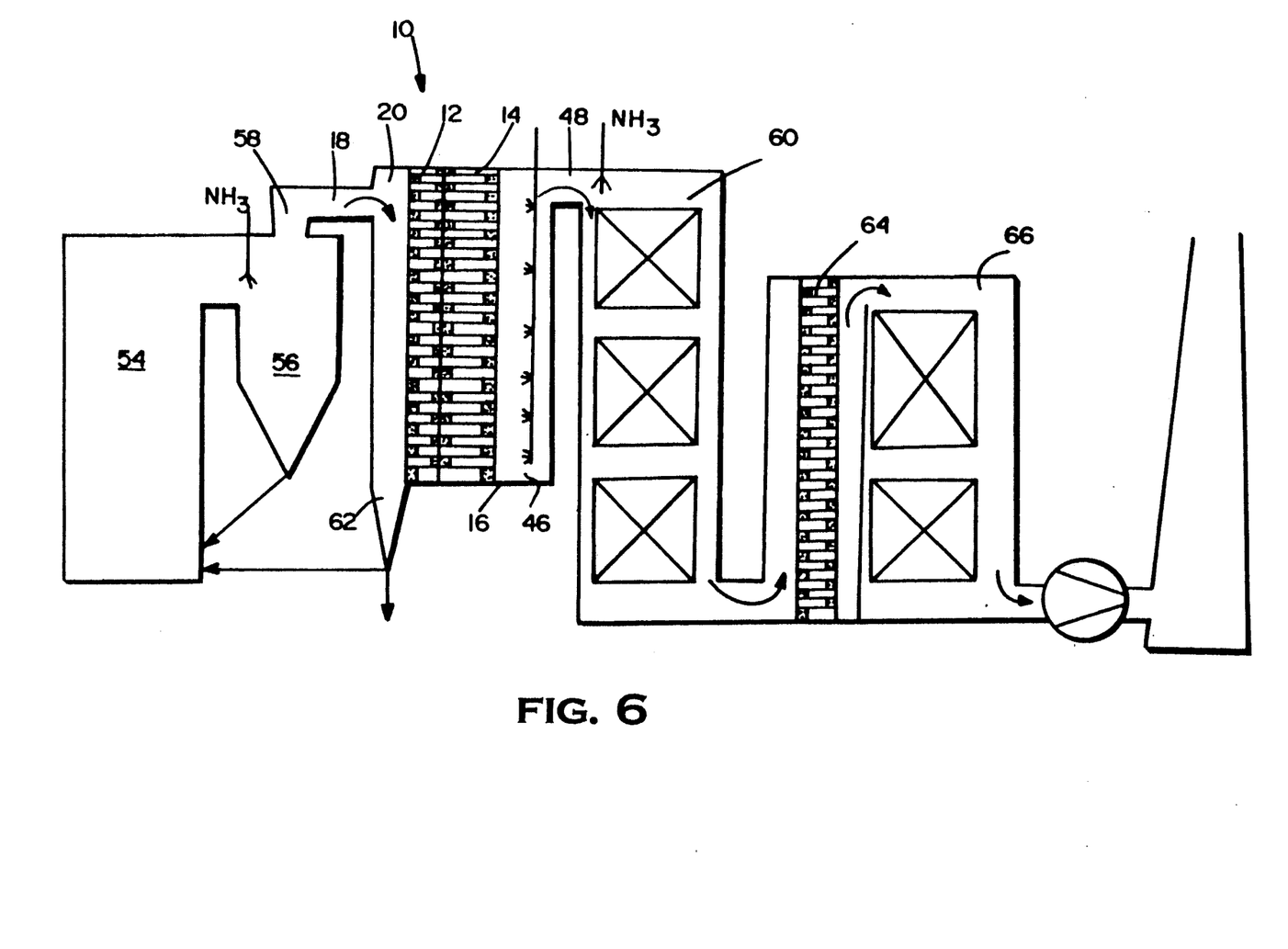
FIG. 6 shows a schematic view of a circulating fluidized bed CFB plant in which a combined barrier filter and catalyst module system according to the present invention is utilized for cleaning flue gases.

FIG. 6 shows a circulating fluidized bed (CFB) plant utilizing an integrated barrier filter and catalyst module system according to the present invention. The drawing shows a CFB system having a fluidized combustor 54, a particle separator 56, a gas passage 58 and a convection section 60.

A hot gas (>600° C.) cleaning system 10 according to the present invention is arranged in the gas passage between the particle separator and the convection section. A filter module 12 and a catalyst module 14, are arranged in the cleaning system in a common housing 16 side by side, without substantially any free space between the modules.

Fly ash and other particles separated in the filter module 12 are collected in a hopper 62. Separation of fly ash before catalytic reduction eliminates poisoning of the catalyst and facilitates use of a dense passageway structure for the catalyst support. The separated particles may be recirculated into the combustor or some other place in the system or may be discharged from the system.

The flexibility of the construction allows the invention to be used for more than only one emission compound, i.e. different catalyst elements can be installed one after another in one single casing. The catalyst materials have to be selected so that they perform optimally in the same temperature level. It is e.g. possible to arrange a CO catalyst downstream of a $N_2O$ catalyst in casing 16.

As an additional advantage of the present new compact catalyst configuration a DENOX catalyst module "slice" 64, for reducing NOX emissions, may be arranged in an optimal rather narrow temperature range of 340° to 370° C., e.g. between heat transfer tube bundles in a first convection section 60 and a second convection section 66. Ammonia injection may preferably be divided between two stages and e.g. be injected into the particle separator and into the convection section 60.

Figure 7:
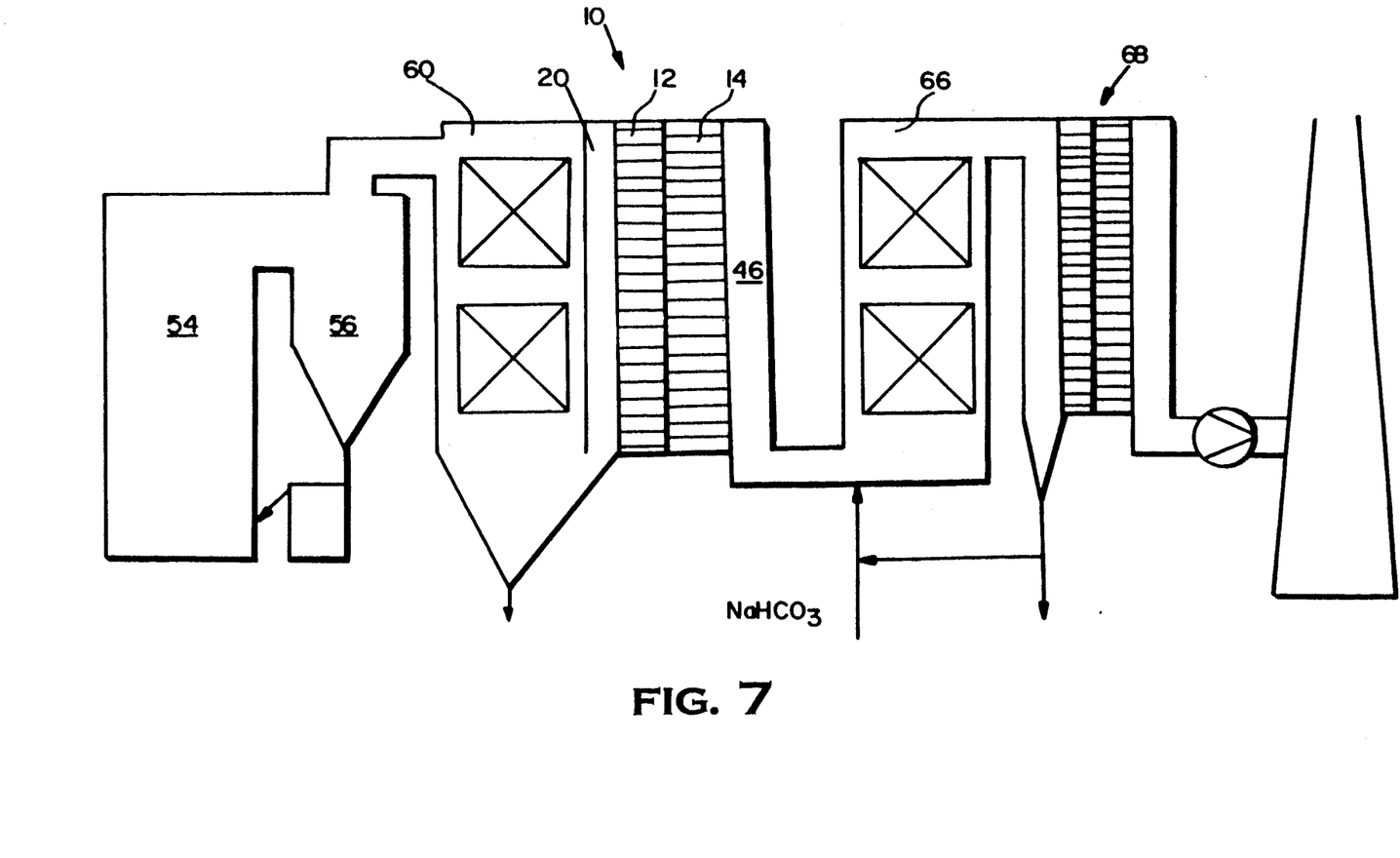
FIG. 7 shows a schematic view of a second CFB plant utilizing another embodiment of the present invention.

FIG. 7 shows another CFB system also having a fluidized combustor 54, a particle separator 56, an integrated barrier filter and catalyst module system 10, as well as, first and second convection sections 60 and 66.

For medium temperature particulate removal and simultaneous reduction of $N_2O$ and $NO_x$ with e.g. a Pt/Rd-catalyst at a temperature level of about 370° C., a combined monolithic filter and monolithic catalyst module system 10 is arranged between heat transfer tube bundles in the two convection sections 60 and 66 in a temperature window of about 370° to 620° C.

Due to the low pressure drop over the monolithic ceramic filter module two combined filter and catalyst module systems 10 and 68 may be used in the CFB system without increasing the fan power requirement excessively.

According to the system shown in FIG. 3, e.g. a sulphur reduction is performed by means of a sorbent, such as sodium bicarbonate, introduced into the gas flow at a suitable temperature interval e.g. about 600° C., downstream of a first combined filter and catalyst module device 10. The sodium bicarbonate calcines in the flue gas and reacts with $SO_2$ forming sodium sulphate. The sodium sulphate is separated from the gas flow in the second combined filter and catalyst module 68. The sorbent separated in the filter module may be recirculated for improving the utilization of the sorbent. Remaining CO and $H_2$ is oxidized with an oxidizing catalyst in the catalyst part of the second combined filter and catalyst module 68.

Comprehensive emission control systems facilitated by the invention are not intended to be limited to CFB processes, but are applicable in connection with different combustion and gasification processes, as well as for reducing pollutant emissions in gases from various chemical and metallurgical processes. Also the selection of catalysts is not intended to be limited to the ones mentioned in the examples. Development of new catalysts, and catalysts for new emission compounds, may result in deviations of the temperature windows presented in the above examples, and hence the selection of different location for the device in the gas stream.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for cleaning flue gases from a combustor moving in a gas flow, the apparatus comprising:
   means for supplying the flue gas from a combustor;
   a barrier filter module, formed of a monolithic ceramic filter support structure coated with a thin porous ceramic layer, the pores of the ceramic layer being 0.04 to 0.5 $\mu$m;
   a catalyst module, formed of a support structure coated with catalyst; and
   means for transporting flue gases from the means for supplying the flue gas to the barrier filter module and then to the catalyst module.

2. Apparatus according to claim 1, wherein the barrier filter module and the catalyst module in the gas flow have essentially the same cross sectional dimension and are arranged in honeycomb casings.

3. Apparatus according to claim 1, wherein the catalyst module is disposed adjacent to the barrier filter module in a common housing.

4. Apparatus according to claim 1, wherein the pores in the ceramic filter forming the support structure for the barrier filter module are about of 4 to 50 μm.

5. Apparatus according to claim 1, wherein the porosity of the ceramic filter forming the support structure is >30% by volume.

6. Apparatus according to claim 5, wherein the porosity of the ceramic filter is in the range of 30 to 50% by volume.

7. Apparatus according to claim 1, wherein the filter support structure comprises passageways arranged through the monolithic structure, the passageways being perpendicular to the gas flow through the filter and the filter comprising 25 to 1400 passageways/sq. inch of the cross section of the filter.

8. Apparatus according to claim 1, wherein the porous ceramic layer in the barrier filter module is 2 to 100 μm thick.

9. Apparatus according to claim 1, wherein a porous honeycomb cell forms the support structure for the catalyst module.

10. Apparatus according to claim 1, wherein a gas impermeable honeycomb cell forms the support structure for the catalyst module.

11. Apparatus according to claim 1, wherein the barrier filter module or the catalyst filter module are arranged in the gas flow in a compartment from which at least one of the modules is withdrawn for maintenance or regeneration.

12. Apparatus according to claim 1, wherein at least two barrier filter modules or at least two catalyst modules are arranged in the gas flow on top of each other.

13. Apparatus according to claim 1, wherein at least two barrier filter modules or at least two catalyst modules are arranged in the gas flow side by side.

14. Apparatus according to claim 1, wherein the barrier filter module and the catalyst module are spaced from each other by a space; and further comprising means for injecting fluid additive for reduction of emissions disposed in the space between the modules.

15. Apparatus according to claim 1, wherein two catalyst modules coated with different catalysts are arranged consecutively in the gas flow.

16. Apparatus according to claim 15, wherein the catalyst modules are arranged in the gas flow at locations having different temperatures.

17. Apparatus according to claim 16, further comprising a convection section disposed in the gas flow between the two catalyst modules, and wherein the first catalyst module is arranged in the gas flow in front of the convection section, and the second catalyst module is arranged after the convection section.

18. Apparatus as recited in claim 1 further comprising a conduit connected to said catalyst module on an opposite side thereof from said barrier filter module; means for injecting a solid additive into a gas flow in said conduit; and a second barrier filter disposed on an opposite side of said conduit from said catalyst module.

19. Apparatus as recited in claim 1 wherein said porous ceramic layer in the barrier filter module is about 50 microns thick.

20. A fluidized bed boiler plant, including a fluidized combustor having an outlet for discharging flue gas, a particle separator for separating particles from the flue gas, a convection section for recovering heat from the flue gas and a gas cleaning system for cleaning the flue gas, and a gas flow path connecting the combustor to a discharge, the gas cleaning system comprising, in a common housing:
a monolithic ceramic filter support structure coated with a ceramic porous membrane, having pores <0.5 μm; and
a monolithic catalyst support structure coated with a first catalyst connected to the filter support structure, between the monolithic ceramic filter and the discharge.

21. A boiler plant according to claim 20, wherein the gas cleaning system is disposed between the particle separator and one side of the convection section, the discharge on the opposite side of the convection section from the particle separator.

22. A boiler plant according to claim 20, wherein the gas cleaning system is arranged in the convection section between heat transfer surfaces of a first part of the convection section and a second part of the convection section at a temperature interval of <600° C.

23. A boiler plant according to claim 20, wherein a second monolithic catalyst support structure module coated with a second catalyst is arranged in the connection section between the gas cleaning system and the discharge.

24. A boiler plant according to claim 20, further comprising a second gas cleaning system disposed in a common housing with said gas cleaning system between said gas cleaning system and the discharge, and comprising: a second monolithic ceramic filter support structure coated with a ceramic porous membrane, having pores <0.5 μm; and a second monolithic catalyst support structure coated with a catalyst connected to the second filter support structure between the second monolithic ceramic filter support structure and the discharge; said second gas cleaning system disposed in the convection section at a temperature interval of <400° C.

25. A boiler plant as recited in claim 20 wherein said particle separator has a particle discharge which is connected to said combustor.

26. A boiler plant as recited in claim 20 wherein said pores of said ceramic porous membrane on said monolithic ceramic filter support structure are 0.04–0.5 microns.

27. A boiler plant as recited in claim 26 wherein the pores in the ceramic filter forming the support structure for the barrier filter module are about 4–50 microns.

28. A boiler plant as recited in claim 20 wherein the porosity of the ceramic filter forming the support structure is greater than 30% by volume.

29. A boiler plant as recited in claim 20 wherein the porosity of the ceramic filter forming the support structure is in the range of 30–50% by volume.

* * * * *